Patented Apr. 18, 1933

1,903,899

UNITED STATES PATENT OFFICE

LEOPOLD LASKA AND OSKAR HALLER, OF OFFENBACH-ON-THE-MAIN, GERMANY, ASSIGNORS TO GENERAL ANILINE WORKS, INC., OF NEW YORK, N. Y., A CORPORATION OF DELAWARE

CARBOXYLIC ACID ARYLIDES OF THE BENZENE SERIES AND PROCESS OF MAKING SAME

No Drawing. Application filed October 23, 1929, Serial No. 401,972, and in Germany October 31, 1928.

Our invention has for its object new carboxylic acid arylides of the benzene series and the process of making the same. The new compounds correspond to the following probable formula:

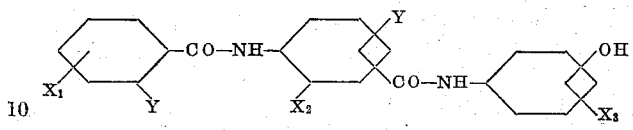

wherein $X_1$ stands for a hydrogen atom or a nitro or methyl group, $X_2$ and $X_3$ stand for a hydrogen atom or a methyl group, and one Y stands for hydrogen and the other Y for a hydroxy group.

The new products are obtained by condensing in the first phase according to the process described in British Patent No. 5,444 of 1915 an aminocarboxylic acid of the benzene series with a hydroxycarboxylic acid of the benzene series and condensing the aroylaminoarylcarboxylic acid compounds thus formed or their acid chlorides, corresponding to the general formula

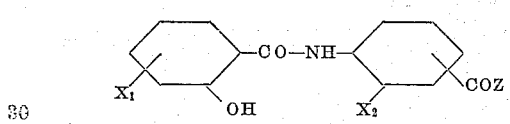

wherein $X_1$ and $X_2$ stand for hydrogen atoms or methyl groups and Z for a hydroxy group or a chlorine atom, with an aminophenol compound, having at least one free ortho- or para-position to the hydroxyl group. Both steps of the reaction may be advantageously carried out in presence of a dehydrating agent and of a diluent.

The same or analogous products are also obtained by at first condensing an aminophenol compound of the character described with an amino- or nitroarylcarboxylic acid or the corresponding acid chloride, reducing the condensation product, if necessary, and further condensing the amino compound thus formed with an aromatic carboxylic acid or its chloride.

The new compounds are in the form of their alkali salts soluble in water in spite of the absence of free sulfo- or carboxylic acid groups. They are distinguished by their affinity for the vegetable fiber whereby the impregnation of cotton goods with the new products may be effected.

In order to further illustrate our invention the following examples are given, the parts being by weight and all temperatures in centigrade degrees, but we wish it to be understood that we are not limited to the particular products or reaction conditions mentioned therein.

Example 1

138 parts of salicylic acid and 137 parts of p-aminobenzoic acid are suspended in about 2000 parts of toluene, then at about 70–80° C. slowly 60 parts of phosphorus trichloride are added and the mixture is heated at about 110° until the evolution of hydrochloric acid gas ceases. The toluene is expelled from the reaction mass by steam and the residue is repeatedly extracted with boiling water in order to remove some unchanged starting material. The formed o'-hydroxybenzoyl-p-aminobenzoic acid is insoluble in the usual organic solvents. It may be purified in the usual manner by redissolving it in an alkaline solution and precipitating it with carbonic acid.

26 parts of the o'-hydroxybenzoyl-p-aminobenzoic acid (or the corresponding amount of its chloride) and 11 parts of m-aminophenol are suspended in about 200 parts of dimethylaniline. Then at 70–80° C. 6 parts of phosphorus trichloride are slowly added and the mixture is heated at about 110° for about 5 hours. After cooling the reaction mass is poured into dilute hydrochloric acid. The precipitate thus formed is filtered off and stirred with a sodium carbonate solution until the waste liquor shows an alkaline reaction, the residual dimethylaniline is expelled with steam and the condensation product is washed out until the waste liquor shows a neutral reaction.

The o'-hydroxybenzoyl-p-aminobenzoyl-m''-aminophenol thus formed of the formula:

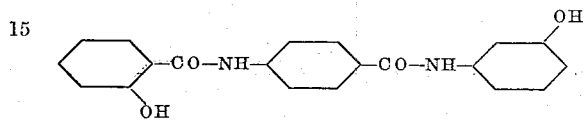

is insoluble in the usual organic solvents. In order to purify this compound it may be dissolved in a caustic alkali solution, the solution may be boiled off with addition of animal charcoal and after filtration the new compound may be precipitated therefrom by introducing carbonic acid.

The course of reaction may be illustrated by the following scheme of equations:

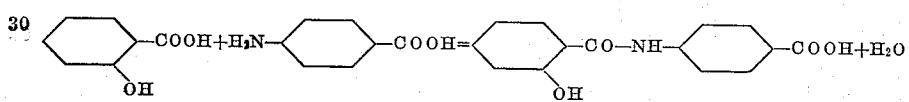

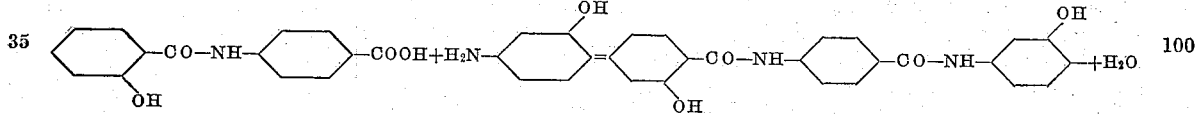

The same product results by first condensing p-nitrobenzoic acid with m-aminophenol, reducing the reaction product and condensing it with salicylic acid.

Analogous products are obtained by condensing, for instance, m-nitrobenzoylchloride with p-aminosalicylic acid and by subsequently condensing the condensation product thus obtained with m-aminophenol, or by condensing m-nitrobenzoic acid with m-aminophenol, reducing the formed reaction product and condensing it with salicylic acid.

*Example 2*

152 parts of m-cresotinic acid of the formula

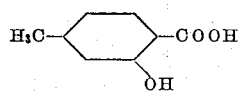

and 137 parts of m-aminobenzoic acid are suspended in about 1200 parts of dimethylaniline. To the mixture at about 60–70° C., 60 parts of phosphorus trichloride are added and finally the mixture is heated at about 110° for about 8 hours. The reaction mass is worked up as described above. The m'-cresoyl-m-aminobenzoic acid thus obtained of the formula

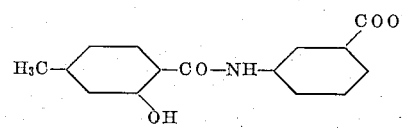

crystallizes from glacial acetic acid and melts at about 280° while decomposing.

271 parts of this acid are then further condensed with 109 parts of m-aminophenol, preferably with addition of dimethylaniline. The condensation reaction and isolation of the reaction product are carried out as described in the foregoing example. The new condensation product thus obtained of the probable formula:

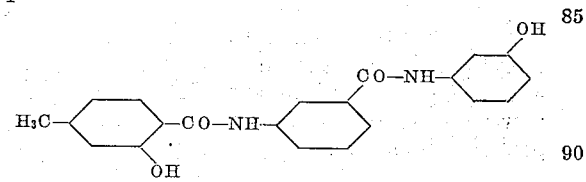

is insoluble in the usual organic solvents. In a pure state it melts at about 215°. According to the same sequence of reaction steps by starting from 152 parts of m-cresotinic acid and 151 parts of 3-amino-4-methylbenzene-1-carboxylic acid a condensation product of the probable formula

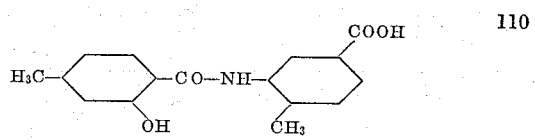

melting at 258–261° is obtained, which yields, when 285 parts thereof are condensed with 109 parts of p-aminophenol, the m'-cresoyl-3-amino-4-methylbenzoyl-p''-aminophenol of the probable formula:

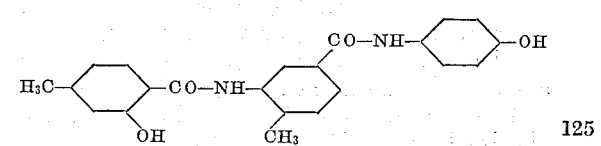

melting at about 240–243°.

In the following table some further condensation products obtainable in a similar manner are named:

| Starting materials: | Condensation product of the first phase: | Condensed with: | End product: |
|---|---|---|---|
| m-cresotinic acid and p-aminobenzoic acid | m'-cresoyl-p-aminobenzoic acid of the formula:<br><br>(structure with CH₃, HO, CO, NH, COOH)<br><br>melting above 350° C. | m-aminophenol | m'-cresoyl-p-aminobenzoyl-m"-aminophenol of the formula:<br><br>(structure with CH₃, HO, CO, NH, CO, NH, OH)<br><br>of about 245–247° melting point |
| m-cresotinic acid and m-aminobenzoic acid | m'-cresoyl-m-aminobenzoic acid<br><br>see Example 2 | m-amino-o-cresol of the formula:<br><br>(structure with NH₂, CH₃, OH) | m'-cresoyl-m-aminobenzoyl-m"-amino-o"-cresol of the formula<br><br>(structure with CH₃, HO, CO, NH, CO, NH, CH₃, OH)<br><br>of about 180–182° melting point |
| o-cresotinic acid and p-aminobenzoic acid | o'-cresoyl-p-aminobenzoic acid of the formula<br><br>(structure with H₃C, HO, CO, NH, COOH)<br><br>of about 274° melting point | m-aminophenol | o'-cresoyl-p-aminobenzoyl-m"-aminophenol of the formula<br><br>(structure with H₃C, HO, CO, NH, CO, NH, OH)<br><br>of about 293–294° melting point |

We claim:

1. As a new compound a carboxylic acid arylide corresponding to the probable formula

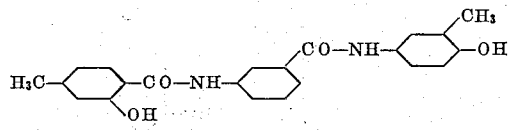

which compound is insoluble in the usual organic solvents, but is rendered soluble in water by the action of alkali.

2. The process which comprises condensing an amino-carboxylic acid of the formula:

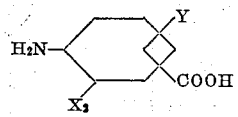

with a carboxylic acid of the formula:

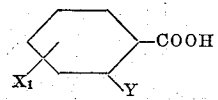

and combining by further condensation the carboxylic acid group of the aroylamino-aryl-carboxylic acid thus formed with the amino group of an amino-hydroxy compound of the formula:

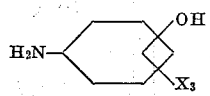

in which formulæ $X_1$ stands for hydrogen atoms, nitro or methyl groups, $X_2$ and $X_3$ stand for hydrogen atoms or methyl groups, and one Y stands for hydrogen and the other Y for a hydroxy group.

3. The process which comprises condensing in the presence of a dehydrating agent and a diluent an amino-carboxylic acid of the formula:

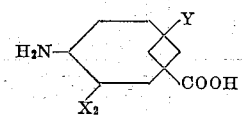

with a carboxylic acid of the formula:

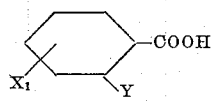

and combining by further condensation in the presence of a dehydrating agent and a diluent the carboxylic acid group of the aroylamino-aryl-carboxylic acid thus formed with the amino group of an amino-hydroxy compound of the formula:

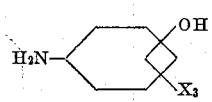

in which formulæ $X_1$ stands for a hydrogen atom, a nitro or methyl group, $X_2$ and $X_3$ stand for hydrogen atoms or methyl groups, and one Y stands for hydrogen and the other Y for a hydroxy group.

4. The process which comprises combining by condensation the carboxylic acid group of an aroyl-amino-aryl-carboxylic acid of the formula:

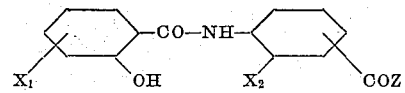

with the amino group of an amino-hydroxy compound of the formula:

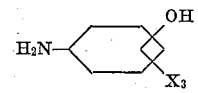

in which formulæ $X_1$, $X_2$ and $X_3$ stand for hydrogen atoms or methyl groups and Z stands for a hydroxy group or a chlorine atom.

5. The process which comprises combining by condensation in the presence of a dehydrating agent and a diluent the carboxylic acid group of an aroylamino-aryl-carboxylic acid of the formula:

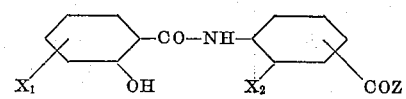

with the amino group of an amino-hydroxy compound of the formula:

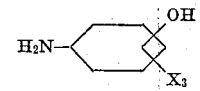

in which formulæ $X_1$, $X_2$ and $X_3$ stand for hydrogen atoms or methyl groups and Z stands for a hydroxy group or a chlorine atom.

6. As new products, carboxylic acid arylides of the benzene series, corresponding to the following probable formula:

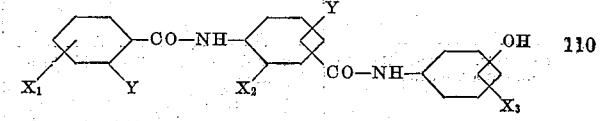

wherein $X_1$ stands for a hydrogen atom or a nitro or methyl group, $X_2$ and $X_3$ stand for a hydrogen atom or a methyl group, and one Y stands for hydrogen and the other Y for a hydroxy group, these products being insoluble in the usual organic solvents and in form of their alkali metal salts soluble in water, and distinguished by their affinity for the vegetable fiber.

7. As new products, carboxylic acid arylides of the benzene series, corresponding to the following probable formula:

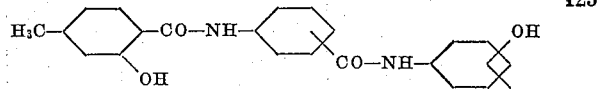

wherein $X_3$ stands for a hydrogen atom or a methyl group, these products being insoluble in the usual organic solvents and in form of their alkali metal salts soluble in water, and distinguished by their affinity for the vegetable fiber.

8. As a new product, a carboxylic acid arylide corresponding to the following probable formula:

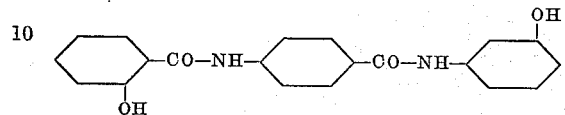

which product is insoluble in the usual organic solvents and in form of its alkali metal salts soluble in water, and distinguished by its affinity for the vegetable fiber.

9. As a new product, a carboxylic acid arylide corresponding to the following probable formula:

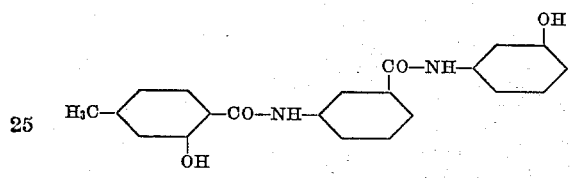

which product is insoluble in the usual organic solvents and in form of its alkali metal salts soluble in water, and distinguished by its affinity for the vegetable fiber.

In testimony whereof, we affix our signatures.

LEOPOLD LASKA.
OSKAR HALLER.